United States Patent [19]

Hamling

[11] 4,162,301

[45] Jul. 24, 1979

[54] FLEXIBLE MICROCRYSTALLINE ZIRCONIUM CARBIDE FABRIC

[75] Inventor: Bernard H. Hamling, Warwick, N.Y.

[73] Assignee: Union Carbide Corporation, New York, N.Y.

[21] Appl. No.: 406,887

[22] Filed: Oct. 16, 1973

Related U.S. Application Data

[63] Continuation of Ser. No. 737,842, Jun. 18, 1968, abandoned, which is a continuation-in-part of Ser. No. 602,571, Dec. 19, 1966, Pat. No. 3,403,008, which is a continuation-in-part of Ser. No. 522,380, Jan. 24, 1966, abandoned.

[51] Int. Cl.$^2$ .............................................. C01B 31/34
[52] U.S. Cl. ................................... 423/440; 75/20 R; 106/43; 106/44; 264/0.5; 264/DIG. 19; 423/251; 423/256; 423/291; 423/345; 423/447.5
[58] Field of Search .................. 252/301.1 R; 264/0.5; 264/DIG. 19; 423/440

[56] References Cited

U.S. PATENT DOCUMENTS

| | | | |
|---|---|---|---|
| 3,017,286 | 1/1962 | Kane | 423/440 X |
| 3,246,950 | 4/1966 | Gruber | 423/346 |
| 3,252,916 | 5/1966 | Wilson et al. | 252/301.1 R |
| 3,269,802 | 8/1966 | Wainer et al. | 423/252 |
| 3,311,689 | 3/1967 | Kelsey | 106/395 X |
| 3,351,484 | 11/1967 | Gutzeit | 117/106 |
| 3,374,102 | 3/1968 | Wainer et al. | 423/439 X |
| 3,385,669 | 5/1968 | Clifton et al. | 423/440 |
| 3,462,340 | 8/1969 | Hough | 161/59 |

OTHER PUBLICATIONS

Funk and Wagnalls Co., The College Standard Dictionary (1938).

*Primary Examiner*—Leland A. Sebastian
*Attorney, Agent, or Firm*—William Raymond Moran

[57] ABSTRACT

Flexible metal carbide fabrics are produced by a process that involves the steps of:
(a) impregnating a preformed organic polymeric fabric with a solution of a metal compound;
(b) heating the impregnated fabric to evolve volatile decomposition products and to leave a carbonaceous relic containing the metal in finely dispersed form; and
(c) further heating the relic to 1000°–2400° C. in a non-oxidizing atmosphere to form the metal carbide. Boron carbide and silicon carbide fabrics produced by this process are attractive for high temperature structural applications.

1 Claim, No Drawings

FLEXIBLE MICROCRYSTALLINE ZIRCONIUM CARBIDE FABRIC

This is a continuation of application Ser. No. 737,842 filed June 18, 1968 and now abandoned which is a continuation-in-part of Ser. No. 602,571, filed Dec. 19, 1966 now U.S. Pat. No. 3,403,008, which was a continuation-in-part of Ser. No. 522,380, filed Jan. 24, 1966, now abandoned.

This invention relates to flexible fabrics that are composed of metal carbides.

By the term "fabric" is meant a composition that is composed of fibers that have been interlocked. Thus, woven, knitted, braided, and the like, articles are included within the definition of "fabric". Also, "fabric" includes certain felts wherein the individual fibers have been interlocked, for example, by needle punching after felting.

One aspect of the process for producing the metal carbide fabrics comprises first providing a compound of a metal dissolved in a solvent, and immersing a preformed organic polymeric fabric in the resulting solution, thereby swelling and opening the organic fiber interstices such that the metal compound is imbibed or absorbed in the interstices. The unimbided metal compound is then removed from the organic fabric outer surfaces and the metal compound-imbibed fabric is dried. Next, the latter is first heated to a temperature of at least 250° C. at a rate sufficiently low to evolve volatile decomposition products of the organic material without destroying the integrity of this polymeric fabric. This pyrolysis step is continued for a sufficient duration to decompose the organic structure of the fabric and form a carbonaceous relic containing the metal in finely dispersed form. In the final carburization step, the relic is further heated from the pyrolysis step to a temperature of about 1000°–2400° C. in a non-oxidizing atmosphere to react the imbided metal with the carbonaceous organic fabric relic to form a metal carbide fabric. The non-oxidizing atmosphere of the carburization step may for example be that of an inert gas, hydrogen, or hydrocarbon reducing gas, vacuum or a combination of any of these atmospheres. There results a metal carbide fabric which has essentially the same physical shape as the original preformed organic polymeric fabric, although the dimensions may be reduced by as much as about 40 to 60 percent.

Although I do not wish to be bound by same, the theory and mechanism of this process appears to be as follows:

Microscopically, organic polymers such as rayon fiber are composed of extremely small crystallites of cellulosic chains (micelles or micorfibrils) held together in a matrix of amorphous cellulose. These crystallites, approximately 40 Angstrom units (Å) in diameter and 250 Å long in high-tenacity rayon yarns, are parallel to the axis of the rayon fiber and are spaced approximately 20 Å apart in the dry state. A one-denier fiber (1 gram weight per 9000 meters of length) has several million crystallites in its cross-section. When the fiber is immersed in a solvent such as water or aqueous solutions, it swells laterally opening the interstices, the amorphous regions enlarge and the crystallite spacing becomes approximately 50 Å (in the case of rayon). The dissolved selected metal compound such as a salt enters the swollen amorphous regions, which is about 85% of the volume of the swollen rayon, and becomes trapped in the amorphous regions between the crystallites when the solvent is evaporated from the fibers.

The metal compounds do not crystallize upon drying of the organic fabric, as would normally occur upon drying a solution, since they are effectively suspended and separated as islands about 50 Å in size between the crystallites.

The organic fabrics may be imbibed with two or more metal compounds from the same solvent solution, so that carbides of more than one metal may be prepared, e.g., tungsten carbide and zirconium carbide. In the first approximation, most metal compounds enter the polymer interstices in direct proportion to their solution concentration, allowing ready control of the relative loadings of metal compounds in the preformed fabric. Owing to the blocking action of the organic crystallites, the metal compounds cannot segregate from each other nor crystallize during the drying and heat conversion steps. Since they are finely dispersed, the metal compounds and later the oxides and carbides are extremely reactive and can be made to undergo the necessary chemical reactions to form the desired metal carbide fabric product at lower temperatures than normally required by conventional coprecipitation or powder blending methods for preparing such mixtures.

Any organic polymeric fabric can be employed as a starting material in the process of this invention providing it is characterized by the above-described sequence of extremely small crystallites held together in a matrix of amorphous regions which enlarge and admit the metal compounds on immersion in the solvent. Any class of materials which are composed of long-chain molecules held together by chemical cross-links may also be used. Any cellulosic material can be employed including rayon, saponified cellulose acetate, cotton, and the like. Other suitable organic materials include the protein fibers (wool and silk) and the man-made acrylics, polyesters, vinyls and polyurethanes. Certain organic materials such as polyethylene and polypropylene are not suitable for practicing the instant process because they cannot be swollen for imbibition of the metal compounds and/or the materials melt and lose their structure during pyrolysis. A preferred cellulosic material is rayon due to its structural uniformity, good imbibition characteristics and low impurity content.

The physical form of the metal carbide fabric is essentially the same as and is determined by the physical form of the organic polymer starting fabric. During conversion of the metal compound-imbibed organic fiber to the metal carbide fiber, the length of the individual fibers shrink to approximately 40 to 60 percent and the diameter to 25 to 35 percent of the original dimensions. Where a yarn composed of a multiplicity of continuous-length metal carbide fibers is desired, a continuous-filament organic yarn is employed as the starting material in the process of this invention. Similarly, where a woven fabric or felt composed or metal carbide fibers is desired, a woven organic fiber cloth or felt is used as the starting material.

In order to obtain adequate tensile strength in the final metal carbide fabric, cellulosic fabrics are imbibed with the metal compounds to the extent of at least one-quarter mole and preferably 1.0–2.0 moles of the metal compound(s) in each "base mole" of cellulose. The term "base mole", as used herein refers to the molecular weight of a glycosidic unit of the cellulose chain (molecular weight of 162). With non-cellulosic materials, the degree of imbibition should be at least 0.1 and preferably 0.5–1.0 gram-equivalent metal ion in the metal compound imbibing solution per gram organic polymer. With lower concentrations of metal compound(s), insufficient metal salt is available in the relic to form a strong article and the process becomes less efficient in terms of metal carbide yield per unit weight of performed organic fabric starting material. Another disadvantage of low metal compound concentrations is that more drastic oxidation conditions are necessary to achieve pyrolysis.

Imbibition or impregnation of the organic fabric can be carried out by several methods. Where the metal element which will appear in the final metal carbide fabric has salts which are highly soluble in water, the imbibition step can be carried out by immersing the organic fabric in a concentrated aqueous solution of such salt. For example, where a ZrC fabric is desired, the organic fabric can be imbibed by immersion in an aqueous solution of zirconyl chloride or zirconyl nitrate having concentrations in the range of 2.5 to 3.0 moles per liter. For salts which hydrolyze extensively (acid reaction) when dissolved in water, the acidity of the impregnating solution is preferably not greater than 1.0 molar (in hydrogen ion) in order to prevent degradation of the organic fiber during immersion. The acid may be neutralized with ammonia, if desired.

Pre-swelling the cellulosic organic fabrics in water prior to immersion in concentrated imbibing solutions is preferably employed to increase both the rate and extent of salt imbibition. Water is also suitable for swelling protein materials. For acrylic and polyester fabrics, aromatic alcohols are suitable swelling agents, and the ketones are useful in swelling vinyl and polyurethane fabrics for the same purpose.

Water is the preferred solvent for metal compound-imbibing of cellulosic fabrics and protein fabrics such as wool and silk. Other solvents such as alcohols do not afford as efficient swelling of the polymers nor solubility of the selected metal compound for a high degree of imbibing. For vinyl and polyurethane fabrics, esters and ketones are appropriate solvents, as for example normal-butyl acetate or methyl ethyl ketone. For acrylic and polyester fabrics, suitable solvents for the metal compound imbibition include aromatic alcohols and amines such as aniline, nitro-phenol, meta-cresol and paraphenylphenol.

Immersion times at normal temperatures (21°–23° C.) required to ive adequate imbibition vary from 30 minutes to several days depending on the salt(s) employed and the type of organic fabric employed. Immersion times greater than about 3 days in concentrated salt solutions are undesirable for fibers since the organic fiber may degrade, resulting in a decrease in amount of metal compound absorbed and causing the polymers to bond to each other. When it is desired to increase the rate of imbibition of the metal compound in the organic fabric to shorten the immersion time, the metal compound solution may be heated to as high as 100° C.

One method of impregnating rayon fibers and other cellulosic fibers with certain important metals is to absorb water into rayon and then contact the rayon with a compound of the metal so that it penetrates the fiber and hydrolyzes or reacts with the absorbed water to form insoluble metal oxide products. The metal oxide product remains in the fiber matrix without greatly disturbing the fibrous character of the rayon. The extent or amount of metal deposited within the fiber is directly a function of the amount of water absorbed in the rayon.

Typical hydrolysis reactions are described by the following reactions:

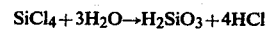

$SiCl_4 + 3H_2O \rightarrow H_2SiO_3 + 4HCl$

$TiCl_4 + 2H_2O \rightarrow TiO_2 + 4HCl$

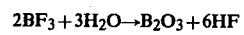

$2BF_3 + 3H_2O \rightarrow B_2O_3 + 6HF$

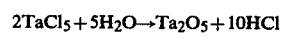

$2TaCl_5 + 5H_2O \rightarrow Ta_2O_5 + 10HCl$

The amount of water absorbed in the rayon fibers is readily controlled by exposing the fibers to air containing the desired amount of moisture. For maximum water absorption the rayon fibers may be immersed directly in liquid water. The amount of water absorbed in textile-grade viscose rayon in equilibrium with moisture in air and liquid water at 75° F. is shown below:

| Relative Humidity at 75° F. | Moisture Content, Percent of Dry Fiber Weight |
|---|---|
| 10 | 4 |
| 30 | 8 |
| 50 | 10 |
| 70 | 14 |
| 80 | 17 |
| 90 | 23 |
| 95 | 30 |
| (immersed in water) | 80–100 |

Some hydrolyzable metal compounds are liquid at normal conditions and the H₂O-laden rayon may be immersed directly in the metal compounds to cause the hydrolysis product to be formed in the fiber. Examples of such liquids are $SiCl_4$, $TiCl_4$, $VOCl_3$, $VCl_4$. However, many of the hydrolysis reactions proceed very rapidly with the evolution of heat. The resulting severe conditions may degrade or break up the fibers; in this event the metal compound is preferably diluted with a non-reactive, miscible liquid to avoid such conditions. Many organic liquids, such as benzene, toluene, hexane, carbon tetrachloride, chloroform, are suitable non-reactive liquids. These organic liquids, when used as diluents for the metal compounds, slow the rates of hydrolysis and help dissipate the heat of reaction. Unreacted metal compound liquid (as well as any diluent) may be removed from between the fibers by evaporation, since they have high vapor pressures.

Other metal compounds which can be incorporated in fibers by hydrolysis reaction but which are not normally liquids, are best utilized when dissolved in a non-reactive liquid which is immiscible with water. Such metal compounds, for example, include $TaCl_5$, $NbCl_5$, $ZrCl_4$, $UCl_4$. Suitable solvents are bromoform, carbon tetrachloride, diethyl ether, and nitrobenzene.

Following imbibition with metal compound(s) from a solvent solution, it is necessary to remove excess solution from between the individual fibers before they dry in order to avoid bonding together of fibers by caked salt. Allowing excess unimbibed metal or hydrolysis product to remain on the fibers results in reduced strength and increased brittleness in the final metal carbide fiber product. For mst cases, blotting thoroughly with absorbent paper or cloth using moderate pressure is sufficient for removing excess solution from the fibers. In addition, vacuum filtration and centrifugation have proven to be effective methods for removing excess solution from between the fibers. Raising the temperature of the wet fibers to 50°–60° C. aids in removing excess solution from the fibers during blotting, vacuum filtration or centrifugation.

The metal compound-imbibed fabric is then thoroughly dried by any convenient means, such as air drying or heating in a stream or warm gas at a temperature not exceeding 70° C. It is desirable to dry the fabric rapidly (in about one hour or less) to prevent expulsion of the metal compound from the interior of the individual fiber to its surface.

When a product containing two or more metal carbides is desired, the fabric is imbibed with compounds containing all of the desired metals. For example, if two or more water-soluble salts are employed, the imbibition can be carried out by a single immersion in an aqueous solution containing both salts. When two metals are desired, one of which is imbibed in organic fabrics from aqueous solution and the second imbibed by hydrolysis of the metal halide or oxyhalide from organic solution, a preferred method is to imbibe first with the hydrolysis product and then with the water-soluble salt.

In the next step of the process of this invention (decomposition of the organic polymer structure), the metal compound-imbibed organic fabric is heated under controlled conditions, namely: (1) to a temperature of at least 250° C., (2) at a rate sufficiently low to evolve volatile decomposition products of the fabric without destroying the fabric integrity, (3) for a sufficient duration to decompose the organic structure of said fabric and form a carbonaceous relic containing the metal compound in finely dispersed form.

It is necessary to heat the metal compound-imbibed fabric at a rate sufficiently low to avoid ignition of the fabric. If the fabric burns instead of carbonizes, the metal compound temperature rises excessively, owing to its contiguous relation to the organic structure. Under such circumstances it is impossible to control the temperature, and the melting point of intermediate metal compounds formed may be exceeded or excessive crystallization and grain growth occurs. Also, the metal compound may be suspended in the organic vapors, and thereby lost from the environment and unavailable to form the desired relic. Also, when ignition is avoided the product fabrics have smoother surfaces, are more free to bend, and are stronger. That is, very rapid heating and expulsion of the decomposition gases causes polymer continuity to be broken and results in excessive crystallization of the metal salt or oxide within the polymer relic which in the final analysis do not yield as smooth, flexible and strong metal carbide fabrics as the unignited amorphous or poorly-crystalline, more dense intermediate metal oxide.

The first heating step may be performed in a non-oxidizing inert atmosphere, as for example that provided by nitrogen, helium, argon, neon and the like, or a vacuum. However, if it is desirable to reduce the quantity of carbon remaining from the polymer pyrolysis step, a portion or all of this first heating step may be performed in an oxygen-containing atmosphere, preferably with between about 5 and about 25 volume percent oxidizing gas. The balance of the gaseous atmosphere comprises gases which are chemically non-reactive with the environment, as for example the previously mentioned inert gases. In the event that an oxygen-containing gas is used, a portion of the carbon is removed as a carbon-containing gas through reaction with the oxidizing gas (volatilized). Oxidation provides a method for reducing the carbon content of the fabric relic, and controlling the molar ratio of carbon-to-metal for the ensuing carburization reaction. In general, pyrolysis of cellulose yields about four moles of carbon per mole cellulose as a residue, and the molar ratio of carbon to metal needed for a stoichiometric carburization reaction is between about 3/1 and 7/4.

The heating rate is affected by the environment whether inert or oxidizing, the latter being more difficult to control. In an oxidizing atmosphere the heating rate may be at least 100° C. per hour of higher, as long as polymer ignition is avoided. It is preferred to heat the polymer at a rate between 10° C. per hour and 100° C. per hour in an atmosphere containing from 5 to 25 volume percent oxygen, although higher heating rates may be satisfactory with effective means for venting and carbon-containing gas. Higher oxygen concentrations may be suitable, particularly during the later portion of the first heating step. The preferred oxidizing gas is oxygen, although other oxidizing gases such as nitrogen dioxide and sulphur trioxide can be used if desired.

When heating of the imbibed fabric is first begun (even in an oxidizing atmosphere), pyrolysis of the fabric to carbon is the predominant chemical reaction. The carbonized fabric comprises predominantly carbon but also can include small amounts of residual oxygen and hydrogen. If the heating continues and in an oxidizing atmosphere, oxidation of the carbon becomes the predominant reaction.

In the final process step of this invention, the relic from the first heating-pyrolysis step is further heated to a temperature between about 1000° C. and 2400° C. in a non-oxidizing atmosphere to react the metal with the carbonaceous relic to form a metal carbide fabric. The non-oxidizing atmosphere may be a vacuum, an inert gas as for example nitrogen, helium, or argon, or alternatively a reducing gas such as hydrogen or a hydrocaron.

A carburization temperature of at least about 1000° C. is necessary to form a crystalline structure, which in turn provides a high-strength product. That is, the tensile strength of the metal carbide products of this invention is greater than 100,000 lbs. per square inch. It is desirable to limit the carburization temperature and time duration to achieve minimum grain size within the article. When producing fibers, crystal grain sizes of less than two-tenths of the fiber diameter are preferred. Larger crystal grain sizes reduce the fiber strength and flexibility. The rate of heating in the carburization step is not critical; rates of between about 200° C. per hour and 1000° C. per hour have been found suitable, although higher rates can be employed. Similarly the overall duration of the carburization step is not critical, and periods of between about 1 and 4 hours may be employed for a batch process, while much shorter times can be employed in a continuous process.

As previously indicated, any metal forming a stable carbide may be used to practice the invention. The preferred carburization conditions in terms of reaction temperature and molar ratios will of course vary somewhat depending on the selected metal. It has been pointed out that in general the molar ratio of carbon to metal for a stoichiometric reaction is between about 3/1 and 7/4. It is preferred to effect carburization under about stoichiometric conditions when a substantially pure metal carbide product is desired. However, non-stoichiometric conditions can be used. For instance, excess carbon can be employed if the desired product is a metal carbide/carbon mixture.

One of the outstanding qualities of the present microcrystalline metal carbide fabrics is their retention of flexibility and strength at high temperature. For this The metal carbide fabrics of the invention are strong and flexible, and they possess the property of being able to withstand repeated folding without failure.

TABLE I

PREPARATION OF METAL CARBIDE FABRICS BY CARBURIZATION OF IMPREGNATED RAYON FABRICS

| Metal Carbide | Melting Point °F.* | Preferred Impregnation Method | Carburization Reactions | Carburization Reaction Temperatures, °C. |
|---|---|---|---|---|
| TiC | 5685 ± 160 | TiCl$_3$ aqueous soln. | TiO$_2$ + 3C→TiC + 200 | 1700–2100 |
| ZrC | 5750 | ZrOCl$_2$ aqueous soln. | ZrO$_2$ + 3C→ZrC + 200 | 1800–2200 |
| HfC | 7030 | HfOCl$_2$ aqueous soln. | HfO$_2$ + 3C→Hfc + 200 | 1900–2300 |
| VC | 5160 | VCl$_3$ aqueous soln. or hydrolysis of VCl$_4$ | V$_2$O$_3$ + 5C→2VC + 300 | 1100–1200 |
| NbC | 6330 ± 230 | Hydrolysis of NbCl$_5$ from ether solution | Nb$_2$O$_3$ + 5C→2NbC + 300 | 1300–1400 |
| TaC | 7015 | Hydrolysis of TaCl$_5$ from ether solution | Ta$_2$O$_5$ + 7C→2TaC + 500 | 1300–1500 |
| Cr$_3$C$_2$ | 3320–3435 | CrCl$_3$ aqueous soln. | 3Cr$_2$O$_3$ + 13C→2Cr$_3$C$_2$ + 900 | 1400–1800 |
| Mo$_2$C | 4650 | (NH$_4$)$_2$MoO$_4$ aqueous soln. | 2MoO$_2$ + 5C→Mo$_2$C + 400 | 1000–1400 |
| MoC | 4875 ± 90 | (NH$_4$)$_2$MoO$_4$ aqueous soln. | MoO$_2$ + 3C→MoC + 200 | 1000–1400 |
| W$_2$C | 5180 ± 90 | Ammonium meta-tungstate aqueous soln. | 2WO$_2$ + 5C→W$_2$C + 400 | 1000–1400 |
| WC | 5200 ± 90 | Ammonium meta-tungstate aqueous soln. | WO$_2$ + 3C→WC + 200 | 1000–1400 |
| UC | 4130–4350 | UO$_2$Cl$_2$ aqueous soln. | UO$_2$ + 3C→UC + 200 | 1200–2000 |
| UO$_2$ | 4350 | UO$_2$Cl$_2$ aqueous soln. | UO$_2$ + 4C→UO$_2$ + 200 | 1200–2000 |
| ThC | 4755 ± 45 | TaCl$_4$ aqueous soln. | ThO$_2$ + 3C→ThC + 200 | 1900–2400 |
| ThO$_2$ | 4810 ± 43 | ThCl$_4$ aqueous soln. | ThO$_2$ + 4C→ThC$_2$ + 300 | 1900–2400 |
| PuO | — | PuOCl$_2$ aqueous soln. | PuO$_2$ + 3C→PuC + 300 | 1200–2000 |
| PuO$_2$ | — | PuOCl$_2$ aqueous soln. | PuO$_2$ + 4C→PuO$_2$ + 300 | 1200–2000 |
| B$_4$C | 4442 | Ammonium pentaborate aqueous soln. | 2B$_2$O$_3$ + 7C→B$_4$C + 600 | 1200–2000 |
| Al$_4$C$_3$ | 5072 | AlCl$_3$ aqueous soln. | 2Al$_2$O$_3$ + 9C→Al$_4$C$_3$ + 600 | 1400–1900 |
| SiO | 4900 | Hydrolysis of SiCl$_4$ | SiO$_2$ + 3C→SiO + 200 | 1400–1400 |

*from various literature sources reason, the fabrics are preferably formed using metal which form carbides having relatively high melting points of at least about 3300° F. On this basis, preferred metals include those from Group IVB (titanium, zirconium, hafnium), Group VB (vanadium, niobium and tantalum), and Group VIB (chromium, molybdenum, and tungsten) of the Periodic Table, as well as boron, aluminum, silicon, thorium, uranium, and plutonium. Table I, below, lists preferred impregnation methods and carburization temperatures for the preparation of these metal carbides using rayon fabrics as the precursor.

The metal carbide fabrics of this invention have numerous uses. For example they may be employed for reinforcing plastics for use at relatively low temperatures, and reinforcing metals and ceramic bodies at high temperatures, particularly where high strength, high Young's modulus, and low weight characteristics are desired. To reinforce plastics, the fabrics should be either on and/or continuous within the geometrical shape of the structure because the loading to the embedded fibers is accomplished via a shear transfer process at the matrix-fiber interface. Since the shear strength of polymers is low, a greater transfer length (i.e., on fibers) is necessary if the fabrics are to carry the major portion of the load. Short fiber-reinforced plastics generally show tensile strengths of about 50,000 psi, whereas the same polymers reinforced with continuous fibers may exhibit strengths of 250,00 psi of greater.

The metal carbide fabrics of the invention are generally useful in high temperature insulation, corrision-resistant articles, and the like.

The process of the invention employs a "preformed" organic polymeric fabric. The term "preformed" means that the organic polymeric fabric has been fabricated into the textile form prior to impregnation with the metal compound.

The following Examples 1–6 illustrate the process for preparing crystalline metal carbide products according to this invention.

EXAMPLE 1—UC FABRIC 7.1 grams of 1.5 denier regular viscose fabric is pre-swelled by immersion in water for one hour, and then immersed in 100 ml. of a uranyl chloride (UO$_2$Cl$_2$) aqueous solution having a molarity of 4.20 and a specific gravity of 2.11. Since the water in the preswollen region dilutes the solution, the latter is replaced with a new 100 ml. of 4.2 molar UO$_2$Cl$_2$ solution. After ten minutes a immersion in the solution, the fabric is removed and centrifuged to remove excess solution. The fabric contain 3.3 grams of solution per gram of rayon. It is dried in a warm air stream and after drying weighs 22.2 grams, including 1.57 grams imbibed uranium per gram rayon. The fabric is next placed in a tube-type furnace and heated in a vacuum of about 1 micron Hg. at a rate of 10° C./hour to 900° C. The furnace is then allowed to cool to room temperature under the vacuum. The resulting carbonaceous fiber relic weighs 14.9 grams and contains finely dispersed uranium with a carbon-to-uranium atom ratio of 3.7. The fabric is black, lustrous and strong, there is no fiber breakage.

These carbonaceous fiber relics have approximately the correct carbon-to-uranium ratio for producing mono-uranium carbide fibers by heating to temperatures of about 1500°–2000° C. in a non-oxidizing atmosphere. For example, UC fibers by the reaction UO$_2$+3C→UC+2CO can be prepared by heating uranium impregnated rayon fabric to about 1700° C. and maintaining this temperature level for a period of 1 hour in an argon atmosphere.

EXAMPLE 2—WC FIBER CLOTH

The solution used for imbibing was made by dissolving 400 grams of ammonium paratungstate in 400 ml of 30% hydrogen peroxide solution. The solution was heated to 60°–70° C. at which temperature the ammonium paratungstate reacted with the hydrogen peroxide and dissolved in 5–10 minutes. The clear solution was then rapidly cooled to room temperature and contained 655 grams of tungsten per liter, with a specific gravity of 1.82 gms/cc and a pH of 1.1. The rayon cloth was of 5 harness satin weave in both fill and warp directions using a textile grade viscose rayon yarn (1650 denier/720 filament), the cloth weight being 15 ounces per square yard. A 6 inch × 18 inch piece of cloth weighing 35.6 grams was immersed in the tungsten salt solution for 17 hours. The cloth was next centrifuged of excess solution and dried in warm air. The dried cloth contained 1.02 grams of tungsten salt/gram of rayon.

The cloth was converted to the tungsten carbide form by first heating in air at a rate of 20° C./hour to 300° C. and maintaining this temperature for four hours. The cloth was then further heated at a rate of 50° C./hour until 350° C. was reached and this temperature was maintained for four hours, thereby forming the carbonaceous fiber relic containing finely divided tungsten in dispersed form. The air in the tube furnace was then purged with nitrogen before the carburization reaction commenced. Dry hydrogen gas was passed through the furnace at a rate of 4 liters/minute (SPT) as the cloth was heated to 600° C. within 30 minutes and held at 600° C. for one hour, then heated to 1000° C. and held there for an hour. During the pyrolysis and carburization steps the cloth shrank from 6 inches × 18 inches to 3 inches × 10 inches. The weight of the tungsten carbide cloth was 75% of the weight of the starting rayon cloth.

The carburized cloth had the following physical and chemical characteristics:

1. Appearance: Lustrous and metallic gray.
2. Flexibility: Could be folded upon itself without creasing or breaking.
3. Tear strength: 8 to 14 lbs/inch of width.
4. Composition: By x-ray powder diffraction analysis, the cloth was composed chiefly of highly crystalline tungsten carbide (WC), (i.e., at least 80 wt. %) and a trace of tungsten metal.
5. Carbon content: 4.98 wt. %
6. Specific gravity: 14.7 gms/cc by the bromoform pycnometer method.
7. Electrical resistence: 1.1 ohm per 1 inch width by 6 inches long (in the long dimenstion).
8. Fiber diameter: 5–6 microns.
9. Crystal grain size: 1 micron.

EXAMPLE 3—ZrC FIBERS

The starting rayon fibers were 1.5 denier viscose tow (133,000 continuous filaments in the tow). The tow weighing 6.8 grams was preswollen in water for 15 minutes prior to immersion in 2.84 molar $ZrOCl_2$ solution for four hours. It was next centrifuged on unimbibed solution from between the fibers and dried in air. The salt-loaded rayon tow weighed 12.5 grams and contained 0.84 grams zirconium salt per gram rayon.

The tow was placed in a tube furnace and heated under a vacuum of 1–10 microns Hg. pressure at a rate of 50° C./hr. to 400° C. then 100° C./hr. to 1000° C. The pyrolyzed fibers were black, had a high luster and weighed 6.0 gms. The fiber relics contained 33.7% carbon and 43.0% zirconium by weight.

In order to carry out the carburization reaction between the carbon and the zirconium the fiber relics were placed in a graphite crubicle and heated at 1900° C. for two hours in a hydrogen atmosphere employing a high frequency induction furnace. The resulting fibers weighed 4.2 gms., had a black-gray color, showed no evidence of sintering together and had a diameter of 4–5 microns. They were very flexible and had a tensile strength between 100,000 and 150,000 polycrystalline face-centered-cubic zirconium carbide (ZrC). No graphite lines were evident in the X-ray patterns. The fibers were over 1 foot long with crystal grain size of less than 0.2 micron.

EXAMPLE 5—$B_4C$ FIBERS

A one-foot length of 20 denier viscose rayon tow (10,000 continuous filaments in the tow) was immersed in an aqueous solution containing 25% by weight boric acid for one hour. The solution was kept at 90° C. during the imbibment to keep the boric acid in solution. The tow was then centrifuged while still hot to remove unimbibed boric acid from between the fibers. After drying the tow in air it was subjected to the same pyrolysis and carburization treatment as described in Example 3.

The reacted fibers were black, free from each other, had appreciable flexibility and strength. X-ray diffraction analysis showed the fibers to be composed of crystalline boron carbide ($B_4C$). The fiber diameter was about 20 microns and the crystal grain size was less than 0.2 of such diameter.

EXAMPLE 6—SiC FIBERS

A length of 20 denier viscose rayon tow (10,000 continuous filaments in the tow) 23-inch long and weighing 13.3 grams was immersed in silicon tetrachloride liquid for 30 minutes. Prior to immersion, the tow contained 1.4 grams of absorbed water. After 30 minutes immersion reaction between the silicon tetrachloride and the water in the rayon was complete as indicated by the subsiding of HCl gas evolution from the fibers. The tow was freed of excess silicon tetrachloride by evaporation. The tow then weighed 15 gms. and contained 3.1 grams of silica. The silicon-loaded rayon tow was pyrolyzed and carburized in the same manner as described in Example 3. The product fibers had a metallic luster, weighed 3.9 gms., and were characterized by appreciable flexibility and strength. X-ray diffraction pattern analysis indicated a mixture of crystalline SiC and graphite. The fiber diameter was about 20 microns and the crystal grain size less than 0.5 microns.

Examples 3–6 showed the production of various metal carbide tows, which are not interlocked fibers. However, when the starting rayon is a fabric such as a woven or knitted fabric, the procedures are analogous to those of Examples 3–6.

What is claimed is:

1. A flexible microcrystalline zirconium carbide fabric which can be folded upon itself without creasing or breaking, the individual fibers of which have:
   (a) a tensile strength greater than 100,000 pounds per square inch,
   (b) a crystal grain size of less than two tenths of a fiber diameter, said zirconium carbide having a melting point of at least about 3300° F.

* * * * *

UNITED STATES PATENT AND TRADEMARK OFFICE
CERTIFICATE OF CORRECTION

PATENT NO. : 4,162,301

DATED : July 24, 1979

INVENTOR(S) : Bernard H. Hamling

It is certified that error appears in the above-identified patent and that said Letters Patent are hereby corrected as shown below:

Column 4, line 29,

Under the column heading "Relative Humidity at 75°F", directly under "95", the number -- 100 -- should be inserted.

Column 7, line 24,

In Table 1, under subheading "Preferred Impregnation Method", "$TaCl_4$" should read -- $ThCl_4$ --.

Column 7, line 26,

In Table 1 under subheading "Metal Carbide" "PuO" should read -- PuC --.

Column 7, line 27,

In Table 1, under subheading "Metal Carbide" "$PuO_2$" should read -- $PuC_2$ --.

UNITED STATES PATENT AND TRADEMARK OFFICE
CERTIFICATE OF CORRECTION

PATENT NO. : 4,162,301

DATED : July 24, 1979

INVENTOR(S) : Bernard H. Hamling

It is certified that error appears in the above–identified patent and that said Letters Patent are hereby corrected as shown below:

Column 7, line 30,

In Table 1 under subheading "Metal Carbide"
    "SiO" should read -- SiC --.

Column 8, Table 1, under subheading "Carburization Reactions",

"200" should read -- 2CO --.
    "200" should read -- 2CO --.
    "200" should read -- 2CO --.
    "300" should read -- 3CO --.
    "300" should read -- 3CO --.
    "500" should read -- 5CO --.
    "900" should read -- 9CO --.
    "400" should read -- 4CO --.
    "200" should read -- 2CO --.
    "400" should read -- 4CO --.
    "200" should read -- 2CO --.
    "200" should read -- 2CO --.
    "200" should read -- 2CO --.
    "200" should read -- 2CO --.

UNITED STATES PATENT AND TRADEMARK OFFICE
CERTIFICATE OF CORRECTION

Page 3 of 3

PATENT NO. : 4,162,301
DATED : July 24, 1979
INVENTOR(S) : Bernard H. Hamling

It is certified that error appears in the above-identified patent and that said Letters Patent are hereby corrected as shown below:

Column 8, Table 1, continued,

Under subheading "Carburization Reactions",

"300" should read -- 3CO --.
  "300" should read -- 3CO --.
  "300" should read -- 3CO --.
  "600" should read -- 6CO --.
  "600" should read -- 6CO --.
  "200" should read -- 2CO --.

Column 8, line 23 of Table 1 under subheading "Carburization Reactions", "$UO_2$" should read -- $UC_2$ --.

Column 8, line 25 of Table 1 under subheading "Carburization Reactions", "$PuO_2$" should read -- $PuC_2$ --.

Column 8, last line under subheading "Carburization Reaction Temperatures, °C.", "1400-1400" should read -- 1400-2400 --.

Signed and Sealed this

Twenty-ninth Day of January 1980

[SEAL]

Attest:

SIDNEY A. DIAMOND

Attesting Officer

Commissioner of Patents and Trademarks